(12) United States Patent
Velrajan et al.

(10) Patent No.: US 8,539,091 B2
(45) Date of Patent: Sep. 17, 2013

(54) METHOD AND SYSTEM FOR PREEMPTING CONTROL OF DATA STREAMING

(75) Inventors: Ganesan Velrajan, Chennai (IN); Balaji Venkat Venkataswami, Chennai (IN); Mahesh Vittal, Chennai (IN); Srinivasan Santhanam, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 1196 days.

(21) Appl. No.: 11/315,427

(22) Filed: Dec. 21, 2005

(65) Prior Publication Data

US 2007/0143491 A1 Jun. 21, 2007

(51) Int. Cl.
*G06F 15/16* (2006.01)

(52) U.S. Cl.
USPC .......................................... 709/231; 709/230

(58) Field of Classification Search
None
See application file for complete search history.

(56) References Cited

U.S. PATENT DOCUMENTS

| | | | |
|---|---|---|---|
| 6,308,327 B1 * | 10/2001 | Liu et al. | 725/37 |
| 6,377,996 B1 * | 4/2002 | Lumelsky et al. | 709/231 |
| 6,577,716 B1 * | 6/2003 | Minter et al. | 379/101.01 |
| 6,701,355 B1 * | 3/2004 | Brandt et al. | 709/219 |
| 6,771,644 B1 * | 8/2004 | Brassil et al. | 370/390 |
| 6,901,604 B1 * | 5/2005 | Kiraly | 725/93 |
| 2002/0067730 A1 * | 6/2002 | Hinderks et al. | 370/395.52 |
| 2003/0005052 A1 * | 1/2003 | Feuer et al. | 709/204 |
| 2004/0003118 A1 * | 1/2004 | Brown et al. | 709/246 |
| 2004/0148625 A1 * | 7/2004 | Eldering et al. | 725/34 |
| 2006/0020964 A1 * | 1/2006 | Yun | 725/33 |
| 2006/0105793 A1 * | 5/2006 | Gutowski et al. | 455/518 |
| 2008/0037576 A1 * | 2/2008 | Hwang et al. | 370/432 |

OTHER PUBLICATIONS

A. Khunger, Inserting Advertisements in IP Multicast, Copyright © The Internet Society, Sep. 1, 2005, 12 pages.
"What is meta tag?", definition from Whatis.com, downloaded Sep. 30, 2011 from http://searchsoa.techtarget.com/definition/meta-tag, 11 pages.
"OSI model—Wikipedia, the free encyclopedia", downloaded Sep. 30, 2011 from http://en.wikipedia.org/wiki/OSI_model#Layer_7:_Application_Layer, 12 pages.
"Protocal data unit—Wikipedia, the free encyclopedia", downloaded Sep. 30, 2011 from http://en.wikipedia.org/wiki/Protocol_data_unit#cite_note-0, 3 pages.

* cited by examiner

*Primary Examiner* — Krista M. Zele
*Assistant Examiner* — Matthew S Lindsey
(74) *Attorney, Agent, or Firm* — Fish & Richardson P.C.

(57) ABSTRACT

Methods and systems have been provided for preempting a secondary service provider from streaming information. The primary service provider sends an Ad-insert control packet for giving control of the streaming to the secondary service provider, during still periods determined on the basis of the Ad-insert control packet. When the primary service provider wants to take back control of streaming from the secondary service provider during the still periods, the primary service provider sends an Ad-insert preempt message. The secondary service provider is then preempted during the periods that are determined on the basis of the Ad-insert preempt message.

20 Claims, 6 Drawing Sheets

METHOD AND SYSTEM FOR PREEMPTING CONTROL OF DATA STREAMING

BACKGROUND OF THE INVENTION

1. Field of Invention

Embodiments of the invention relate, in general, to multicast streaming in a network. More specifically, embodiments of the invention relate to methods and systems for preempting control of multicast streaming.

2. Description of the Background Art

Data streaming is a method of transmitting data in a steady and continuous stream of packets from a source to a destination in a network. The stream of packets can include audio data, video data or a combination thereof. Data streaming transmits data in a compressed form over the network. Further, the transmitted data is played as soon as it arrives at the destination. There are two types of data streaming: unicast streaming and multicast streaming. Multicast streaming enables the transmission of identical data to more than one destination in the network. The Internet Group Management Protocol (IGMP) is a communication protocol that manages the process of multicast streaming in the network by managing the membership of Internet Protocol multicast groups. In the past, multicast streaming did not include advertisements while transferring main data to the multicast groups via a multicast stream. However, with the introduction of new technologies, multicast stream includes advertisements along with the main data. For example, a recent draft memo entitled *Inserting Advertisements in IP multicast draft-akhunger-ad-insert-multicast*-00, available at the Internet Engineering Task Force (IETF) web site (http://www.ietf.org/internet-drafts/draft-akhunger-ad-insert-multicast-00.txt) the disclosure of which is incorporated herein by reference, has kindled interest in the increased possibilities of controlling advertisements streaming when a national main event stream is interleaved with local/regional advertisements.

The advertisements can be inserted in the advertisement slots. The advertisement slots are decided by a primary source of data. Two types of advertisement slots can be included in the multicast stream. In the first type of advertisement slot, the primary source of data inserts the advertisements in the advertisement slots. These advertisements are received by all the members of the multicast group connected to the primary source of data.

The second type of advertisement slot is used to insert advertisements by secondary service providers, such as regional service providers. In this case, the main source of data informs a secondary service provider about the advertisement slots by sending an Ad-insert control packet. The Ad-insert control packet includes an Ad-insert message. The Ad-insert message indicates when the secondary service provider can take over the control of streaming from the primary source. Thereby, allowing the secondary service provider to utilize the specified time to insert its advertisements and send to the multicast group. However, in the case of emergencies such as hurricane, tornado or tsunami warning, the primary source may require to send emergency messages. Therefore, the primary source may require taking back control from the secondary service provider after sending the Ad-insert control packet. However, the primary source cannot take back control from the secondary service provider after sending the Ad-insert control packet.

DETAILED DESCRIPTION OF EMBODIMENTS OF THE INVENTION

Various embodiments of the invention provide methods, systems, and computer-readable media for controlling streaming of data in a network. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Various embodiments of the invention provide methods and systems for preempting a secondary service provider from streaming secondary information. The primary service provider sends an Ad-insert control packet for giving control of the streaming to the secondary service provider during periods that are determined on the basis of the Ad-Insert control packet. The primary service provider sends an Ad-insert preempt message after sending the Ad-Insert control packet for preempting the secondary service provider for the periods that are determined on the basis of the Ad-insert preempt message. This allows the primary service provider to take back the control from the secondary service provider.

Figure 1:
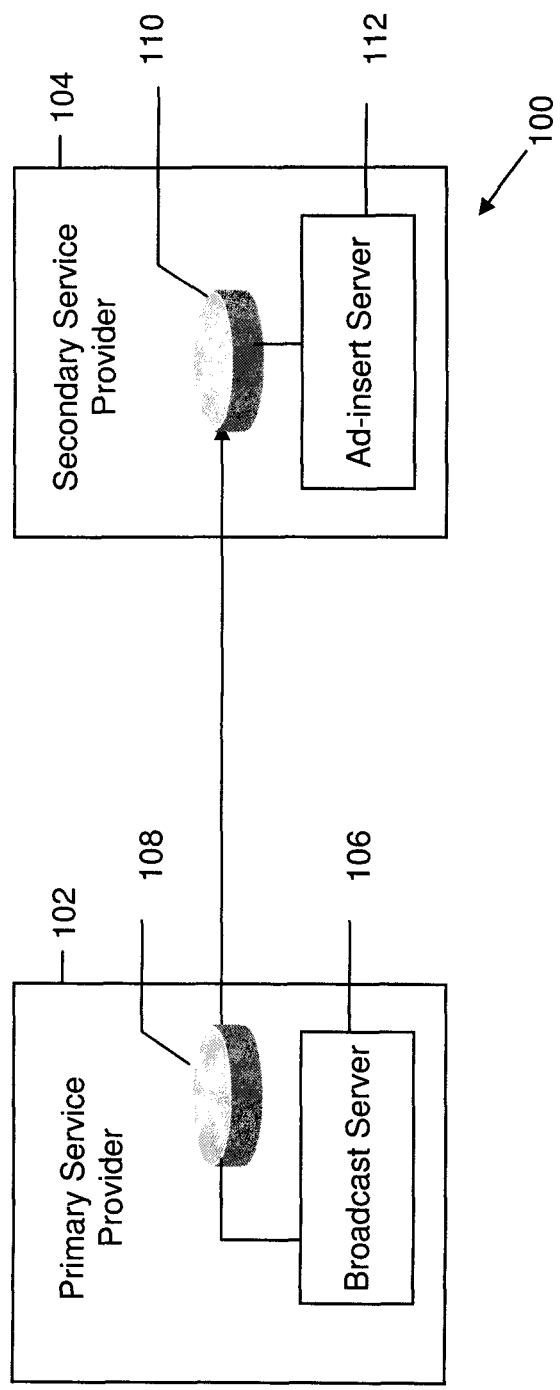
FIG. 1 illustrates an environment wherein various embodiments of the invention can be performed.

Referring now to drawings, more particularly by their reference numbers, FIG. 1 illustrates an environment 100, wherein various embodiments of the invention can be performed. A primary service provider 102 can send a multicast stream of a main event to multicast receivers via service provider 104. Service providers 102 and 104 are coupled by a plurality of network infrastructure devices that include routers 108 and 110. Examples of primary service provider 102 include but are not limited, to international streamers, national streamers and regional streamers. For example, primary service provider 102 can stream a live cricket match to multicast receivers. In this case, the live cricket match is the main event for all the multicast receivers that is streamed by a broadcast server 106 through router 108 to router 110, which is located at each secondary service provider 104.

However, during the streaming, there can be periods when primary service provider 102 does not stream the main event to the multicast receivers. Such periods are hereinafter referred to as still periods. During the still periods, primary service provider 102 can transfer control of streaming to secondary service provider 104. Examples of secondary service provider 104 include but are not limited to national streamers and regional streamers. In an embodiment of the invention, primary service provider 102 is a national streamer and secondary service provider 104 is a regional streamer.

Primary service provider 102 sends an Ad-insert control packet to secondary service provider 104 to provide information regarding the still periods. On receiving the information about the still periods from the Ad-insert control packet, secondary service provider 104 can utilize the still periods to stream information, hereinafter referred to as secondary information from an Ad-insert server 112. Examples of the secondary information include but are not limited to advertisements, announcements, and news and weather information of the region corresponding to secondary service provider 104.

Primary service provider 102 sends the Ad-insert control packet to secondary service provider 104 whenever primary service provider 102 wants to transfer control of the streaming to secondary service provider 104. However, primary service provider 102 may require to or want to take back control from secondary service provider 104 even after sending the Ad-insert control packet. For example, in case of emergencies such as a hurricane, tornado or tsunami warning, primary service provider 102 requires to take back control from secondary service provider 104 for sending emergency messages. Therefore, secondary service provider 104 is preempted from streaming the secondary information so that primary service provider 102 can stream such emergency messages.

Figure 2:
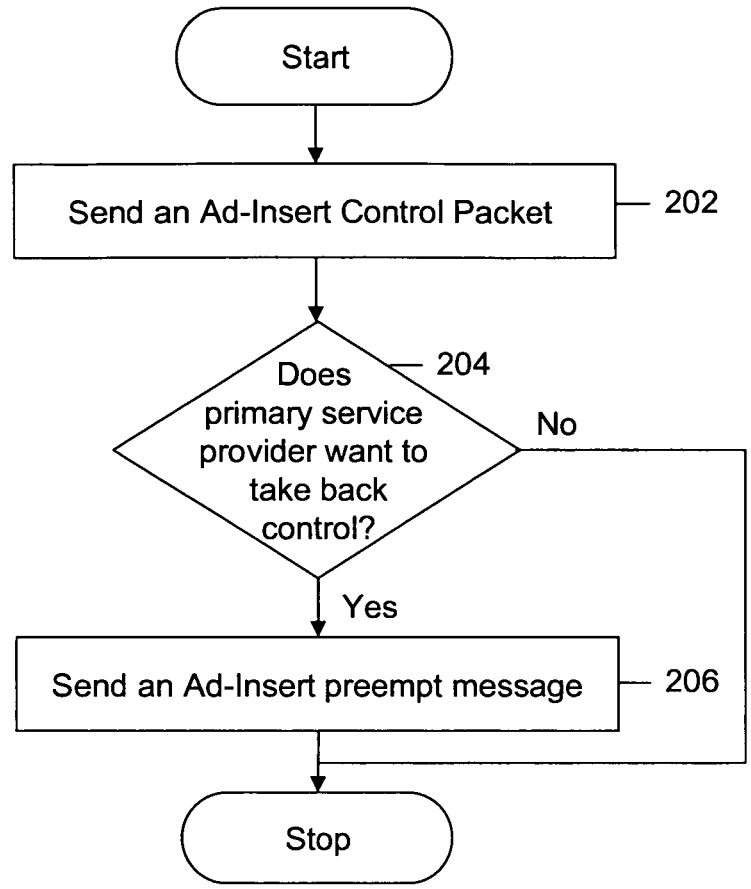
FIG. 2 is a flowchart, illustrating a method for taking over control of streaming, in accordance with various embodiments of the invention.

FIG. 2 is a flowchart, illustrating a method for taking over control of the streaming from secondary service provider 104, in accordance with various embodiments of the invention. At step 202, primary service provider 102 sends the control packet for transferring control of the streaming to secondary service provider 104. Secondary service provider 104 can stream the secondary information during the periods that are determined on the basis of the Ad-insert control packet. At step 204, primary service provider 102 decides if it wants to take over control of the streaming from secondary service provider 104. If primary service provider 102 wants to take over control of the streaming from secondary service provider 104, then, at step 206, primary service provider 102 sends an Ad-insert preempt message. The Ad-insert message is sent for preempting secondary service provider 104 from streaming the secondary information.

Figure 3:
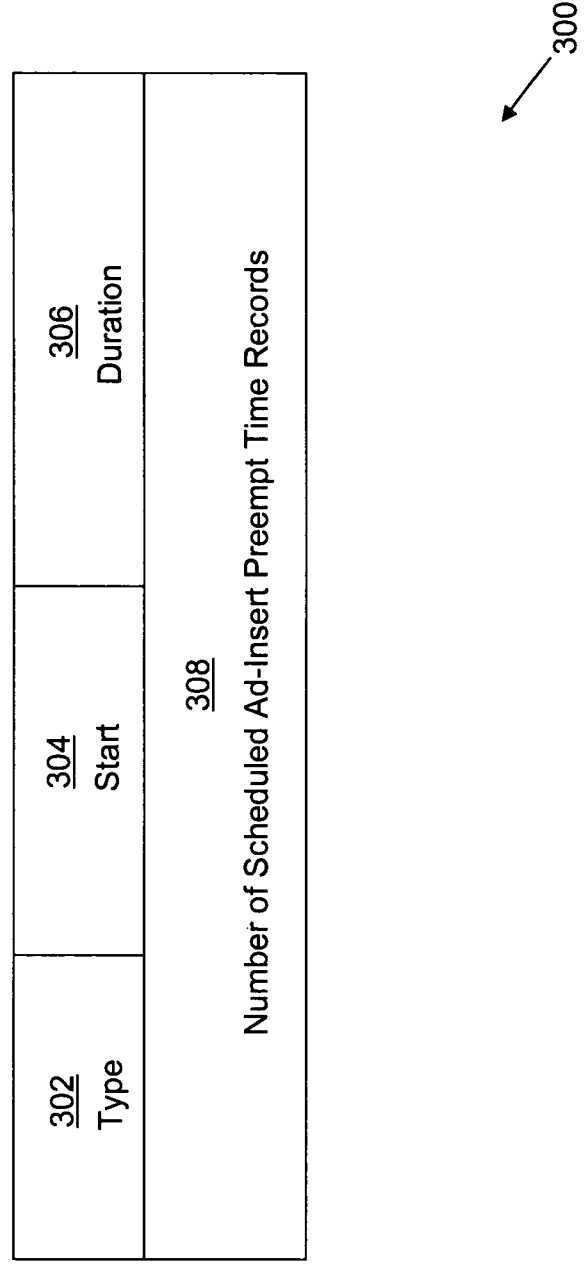
FIG. 3 illustrates various fields of an Ad-insert preempt message, in accordance with an embodiment of the invention.

FIG. 3 illustrates an Ad-insert preempt message 300 indicating various fields related to taking over control of the streaming from secondary service provider 104, in accordance with an embodiment of the invention. Ad-insert preempt message 300 is an additional Protocol Data Unit (PDU) sent by primary service provider 102 to secondary service provider 104 after sending the Ad-insert control packet. Ad-insert preempt message 300 includes various fields such as 'type' 302, 'start flag' 304, 'duration in millisec' 306 and 'number of scheduled Ad-insert preempt time records' 308. Type 302 indicates that Ad-insert preempt message 300 is an Ad-insert preempt type of Internet Group Management Protocol (IGMP) message. Start flag 304 indicates whether primary service provider 102 is going to take over control of the streaming from secondary service provider 104 immediately or at a scheduled time. The control is taken over immediately when start flag 304 indicates 'immediate play'. This implies that secondary service provider 104 is preempted from sending the stream of the secondary information as soon as it receives Ad-insert preempt message 300. Duration 306 indicates the duration for which secondary service provider 104 is preempted from streaming the secondary information, if the control is taken over immediately. In an embodiment of the invention, the duration is specified in milliseconds. When start flag 304 indicates that the control has to be taken over at the scheduled time, then the scheduled time is specified in an Ad-insert preempt time record. The number of scheduled Ad-insert preempt time records 308 indicates the number of Ad-insert time records included in Ad-insert preempt message 300.

Figure 4:
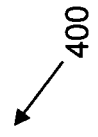
FIG. 4 illustrates various fields of an Ad-insert Time Record, in accordance with an embodiment of the invention.

FIG. 4 illustrates an Ad-insert time record 400 indicating various fields for specifying the scheduled time, in accordance with various embodiments of the invention. Ad-insert time record 400 is received by secondary service provider 104 when it is to be preempted at a scheduled time. Ad-insert time record 400 includes fields such as a 'group address' 402 for indicating the group address of a network device connected to secondary service provider 104. Ad-insert time record 400 further includes various fields, indicating the scheduled time. For example, Ad-insert time record 400 includes the fields of: 'time zone' 404, 'year' 406, 'month' 408, 'day' 410, 'hour' 412, 'minutes' 414, 'seconds' 416 and 'milliseconds' 418 for specifying the scheduled time. The Ad-insert time record further includes a 'duration' 420 for indicating the duration for which secondary service provider 104 is preempted. In an embodiment of the invention, duration 420 is indicated in milliseconds. The Ad-insert time record further includes 'source-specific info' 422 that is a field used by primary service provider 102 to insert some additional information such as identification, to secondary service provider 104. One skilled in the art will appreciate that the source-specific identification information is dependent on the specific application and is reserved so that the service providers can adapt to application specific timing, broadcast or engineering requirements.

As described earlier, primary service provider 102 preempts secondary service provider 104 by sending Ad-insert preempt message 300 and Ad-insert time record 400.

Figure 5:
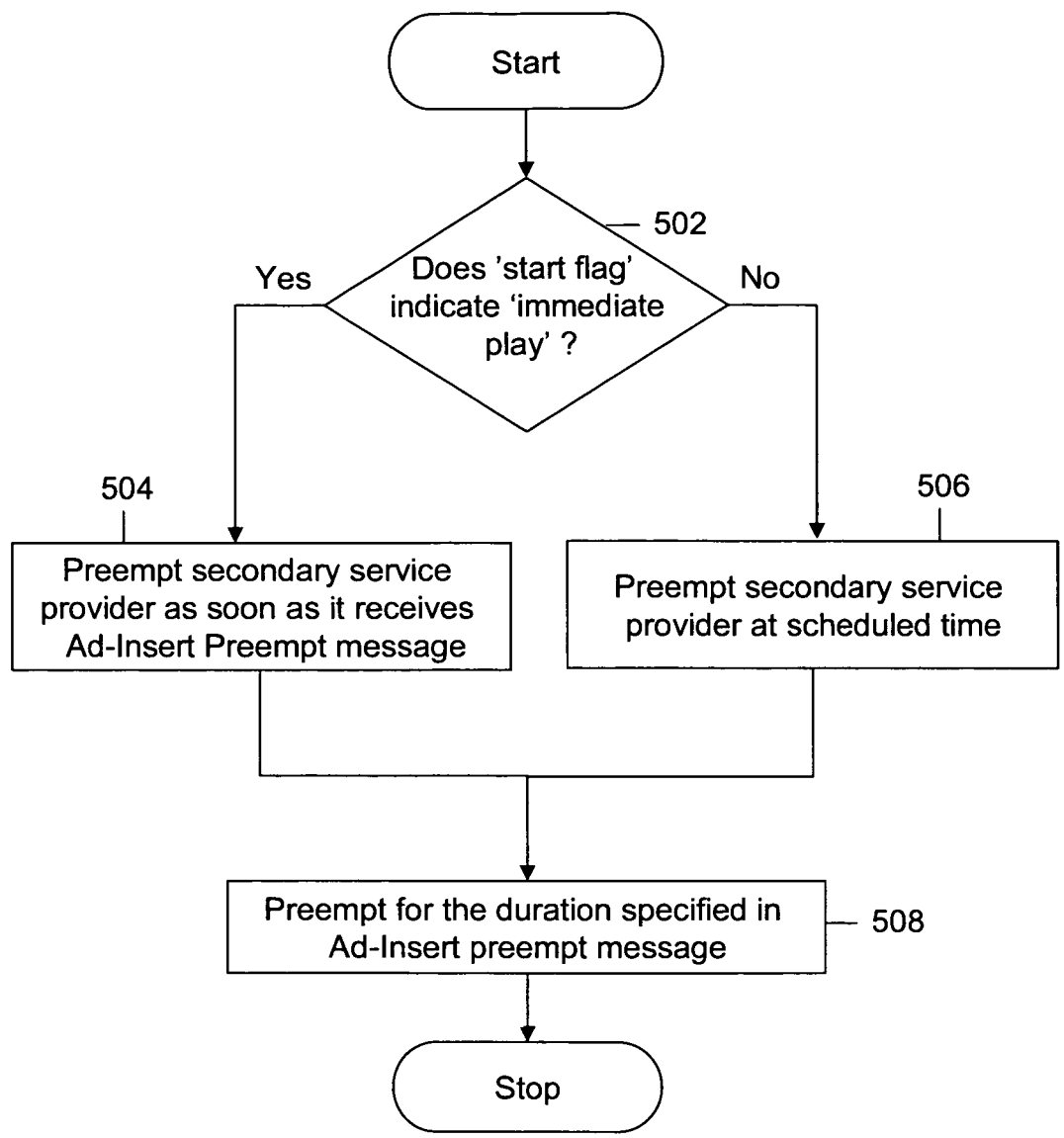
FIG. 5 is a flowchart, illustrating a method for preempting, in accordance with an embodiment of the invention.

FIG. 5 is a flowchart, illustrating a method for preempting secondary service provider 104 by sending Ad-insert preempt message 300 and Ad-insert time record 400, in accordance with an embodiment of the invention. At step 502, secondary service provider 104 checks if start flag 302 indicates 'immediate play'. If start flag 302 indicates immediate play then, at step 504, secondary service provider 104 is preempted from streaming the secondary information as soon as it receives Ad-insert preempt message 300. If the start flag 302 does not indicate immediate play, then, at step 506, secondary service provider 104 is preempted at an indicated scheduled time. In this case, secondary service provider 104 will also receive Ad-insert time record 400. Further, at step 508, secondary service provider 104 is preempted for a specified duration. The duration is specified in duration 306 if secondary service provider 104 is preempted immediately and it is specified in duration 420 if secondary service provider 104 is preempted at the scheduled time.

Figure 6:
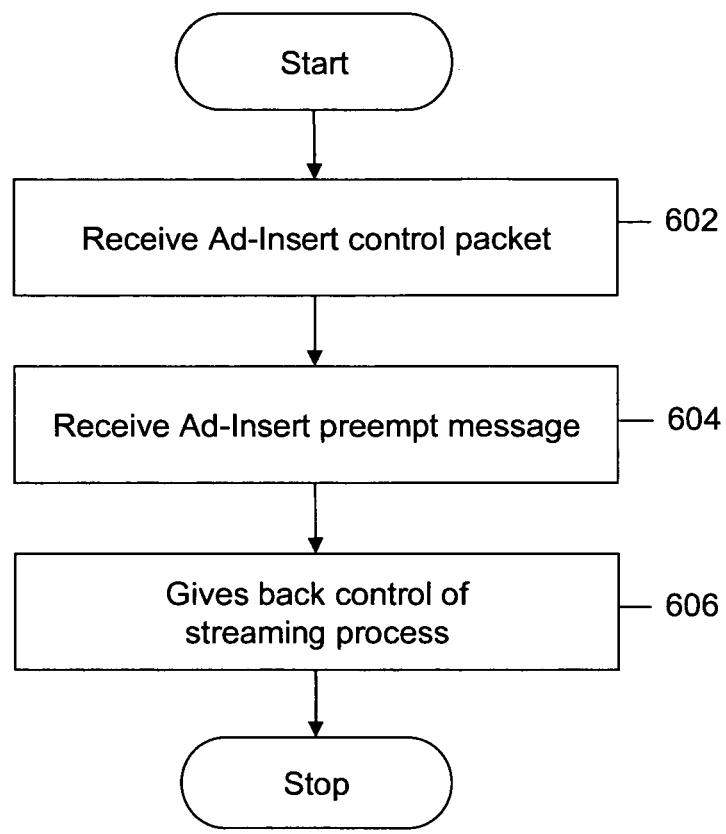
FIG. 6 is flowchart, illustrating a method for giving back control of streaming, in accordance with an embodiment of the invention.

FIG. 6 is a flowchart, illustrating a method of giving back control of the streaming by secondary service provider 104, in accordance with an embodiment of the invention. At step 602, secondary service provider 104 receives an Ad-insert control packet. Secondary service provider 104 can start streaming the secondary information during the periods that are determined on the basis of the Ad-insert control packet. At step 604, secondary service provider 104 receives Ad-insert preempt message 300. If secondary service provider 104 has already started streaming the secondary information, then it discontinues the streaming for the time determined, based on Ad-insert preempt message 300. Further, at step 606, secondary service provider 104 gives back the control of the streaming for the periods that are determined on the basis of Ad-insert preempt message 300.

In accordance with an embodiment of the invention, secondary service provider 104 can receive Ad-insert preempt message 300 immediately after receiving the Ad-insert control packet. In this case, secondary service provider 104 is preempted before it starts streaming. In accordance with another embodiment, secondary service provider 104 receives Ad-insert preempt message 300 after some time of receiving Ad-insert control packet. In this case, secondary service provider 104 may be preempted after it starts streaming the secondary information during the periods that are determined on the basis of Ad-insert preempt message 300.

In accordance with an embodiment of the invention, the preempting of secondary service provider 104 from streaming the secondary information is facilitated. Secondary service provider 104 is preempted after it takes control of the streaming, based on a received Ad-insert control packet.

In accordance with an embodiment of the invention, the preempting of secondary service provider 104 from sending the stream of the secondary information immediately after receiving Ad-insert preempt message 300 is facilitated.

In accordance with an embodiment of the invention, facilitate the preempting of secondary service provider 104 from sending the stream of the secondary information at the scheduled time specified in Ad-insert preempt time record 400 is facilitated.

In accordance with an embodiment of the invention, specifying the duration for which secondary service provider 104 is preempted from sending the stream of secondary information is facilitated.

In accordance with an embodiment of the invention, the taking over of control of the streaming from secondary service provider 104 without modifying the Ad-insert control packet is facilitated.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a ","an" and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:

enabling a primary service provider for multicast streaming primary content;

forwarding, by the primary service provider, the primary content to multicast receivers via a secondary service provider;

sending, by the primary service provider, an Ad-insert control packet for giving control of multicast streaming from the primary service provider to the secondary service provider during one or more time periods when the primary service provider is not multicast streaming primary content, the one or more time periods indicated in the Ad-insert control packet, wherein giving control of multicast streaming comprises enabling the secondary service provider to stream secondary information during the one or more time periods;

after sending the Ad-insert control packet, sending, by the primary service provider, an Ad-insert preempt message to the secondary service provider, wherein the Ad-insert preempt message includes a field indicating that the Ad-insert preempt message is an Ad-Insert Preempt type of Internet Group Multicast Protocol (IGMP) message and indicates a time period during which the primary service provider intends to take control of the multicast streaming from the secondary service provider, the time period being associated with at least one time period indicated in the Ad-insert control packet; and based on sending the Ad-insert preempt message, multicast streaming, by the primary service provider, a message that is different from the Ad-insert preempt message during the time period indicated in the Ad-insert preempt message, wherein the secondary service provider discontinues multicast streaming the secondary information during the time period indicated in the Ad-insert preempt message.

2. The method of claim 1, wherein multicast streaming the secondary information comprises streaming of advertisements.

3. The method of claim 1, wherein the Ad-insert preempt message includes a field indicating a duration for which the primary service provider takes control of the multicast streaming from the secondary service provider.

4. The method of claim 1, wherein the Ad-insert preempt message includes a field indicating a group address of a multicast group for which the primary service provider takes control of the multicast streaming from the secondary service provider.

5. The method of claim 1, wherein taking control of the multicast streaming from the secondary service provider comprises preventing the secondary service provider from multicast streaming the secondary information as soon as the secondary service provider receives the Ad-insert preempt message.

6. The method of claim 5, wherein the Ad-insert preempt message includes a start flag field, and wherein the secondary service provider is prevented from multicast streaming the secondary information as soon as the secondary service provider receives the Ad-insert preempt message based on information indicated in the start flag field.

7. The method of claim 1, wherein taking control of the multicast streaming from the secondary service provider comprises:

specifying a scheduled time in an Ad-insert preempt time record included in the Ad-insert preempt message; and preventing the secondary service provider from multicast streaming the secondary information at the scheduled time.

8. The method of claim 7, wherein the Ad-insert preempt message includes more than one Ad-insert preempt time record.

9. The method of claim 7, wherein specifying the scheduled time comprises specifying parameters selected from the group consisting of a time zone, a year, a month, a day, an hour, a minute, a second and a millisecond.

10. The method of claim 7, wherein the time record includes a source-specific info field that is used by the primary service provider to insert additional information for the secondary service provider, the additional information including identification of the primary service provider.

11. A system comprising:

a first computing module comprising instructions encoded in a non-transitory machine-readable medium for execution by a processor and configured to cause the processor to perform operations comprising:

sending an Ad-insert control packet for giving control of multicast streaming from a primary service provider to a secondary service provider during one or more time periods when the primary service provider is not multicast streaming primary content, the one or more time periods indicated in the Ad-insert control packet, wherein giving control of multicast streaming comprises enabling the secondary service provider to stream secondary information during the one or more time periods;

a second computing module comprising instructions encoded in a non-transitory machine-readable medium for execution by the processor and configured to cause the processor to perform operations comprising:

generating an Ad-insert preempt message;

the first computing module further comprising instructions that are configured to cause the processor to perform operations comprising:

after sending the Ad-insert control packet, sending the Ad-insert preempt message from the primary service provider to the secondary service provider, wherein the Ad-insert preempt message includes a field indicating that the Ad-insert preempt message is an Ad-Insert Preempt type of Internet Group Multicast Protocol (IGMP) message and indicates a time period during which the primary service provider intends to take control of the multicast streaming from the secondary service provider, the time period being associated with at least one time period indicated in the Ad-insert control packet; and means for multicast streaming, by the primary service provider, a message that is different from the Ad-insert preempt message during the time period indicated in the Ad-insert preempt message, wherein the secondary service provider discontinues multicast streaming the secondary information during the time period indicated in the Ad-insert preempt message.

12. The system of claim 11, wherein the secondary service provider further comprises a router for receiving the Ad-insert control packet and for receiving the Ad-insert preempt message after receiving the Ad-insert control packet from the primary service provider.

13. The system of claim 11, wherein the Ad-insert preempt message comprises an Ad-insert preempt time record that indicates a scheduled time for taking control of the multicast streaming by the primary service provider.

14. The system of claim 13, wherein the Ad-insert preempt time record comprises a field for indicating a group address of a multicast group for which the primary service provider takes control of the multicast streaming from the secondary service provider.

15. The system of claim 14, wherein the Ad-insert preempt time record comprises a field indicating a duration for which the primary service provider takes control of the multicast streaming from the secondary service provider.

16. The system of claim 13, wherein the second computing module is further configured to enable the Ad-insert preempt message to include more than one Ad-insert preempt time record.

17. The system of claim 13, wherein the scheduled time indication comprises parameters related to the scheduled time in the Ad-insert preempt time record, the parameters being related to the scheduled time being selected from a group of temporal parameters consisting of a time zone, a year, a month, a day, an hour, a minute, a second and a millisecond.

18. The system of claim 13, wherein the Ad-insert preempt message includes a start flag field, and wherein the secondary service provider is prevented from multicast streaming the secondary information as soon as the secondary service provider receives the Ad-insert preempt message based on information indicated in the start flag field.

19. The system of claim 13, wherein the Ad-insert preempt time record includes a source-specific info field that is used by the primary service provider to insert additional information for the secondary service provider, the additional information including identification of the primary service provider.

20. An apparatus comprising:

a processing system including a processor coupled to a display and user input device; and a non-transitory computer-readable storage medium including instructions executable by the processor, the instructions being configured to cause the processor to execute instructions for one or more operations comprising:

enabling a primary service provider for multicast streaming primary content;

forwarding, by the primary service provider, the primary content to multicast receivers via a secondary service provider;

sending, by the primary service provider, an Ad-insert control packet for giving control of multicast streaming from the primary service provider to the secondary service provider during one or more time periods when the primary service provider is not multicast streaming primary content, the one or more time periods indicated in the Ad-insert control packet, wherein giving control of multicast streaming comprises enabling the secondary service provider to stream secondary information during the one or more time periods;

after sending the Ad-insert control packet, sending, by the primary service provider, an Ad-insert preempt message to the secondary service provider, wherein the Ad-insert preempt message includes a field indicating that the Ad-insert preempt message is an Ad-Insert Preempt type of Internet Group Multicast Protocol (IGMP) message and indicates a time period during which the primary service provider intends to take control of the multicast streaming from the secondary service provider, the time period being associated with at least one time period indicated in the Ad-insert control packet; and based on sending the Ad-insert preempt message, multicast streaming, by the primary service provider, a message that is different from the Ad-insert preempt message during the time period indicated in the Ad-insert preempt message, wherein the secondary service provider discontinues multicast streaming the secondary information during the time period indicated in the Ad-insert preempt message.

* * * * *